Feb. 2, 1965  D. J. SWARTZ  3,167,833
SAFETY PIN
Filed Feb. 4, 1964
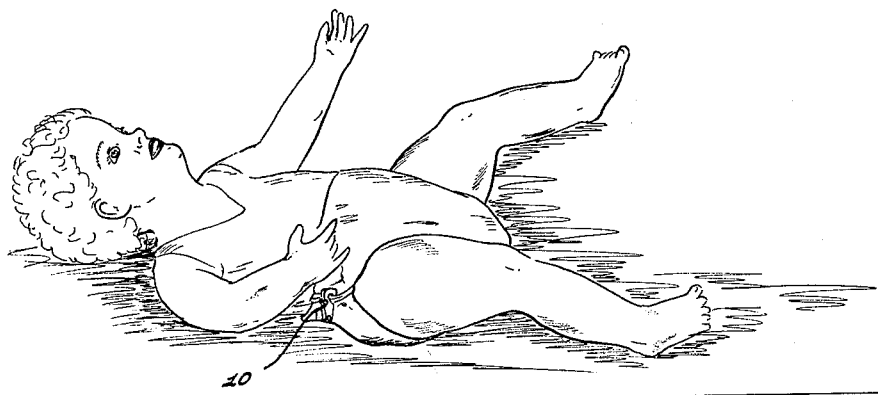
Fig. 1
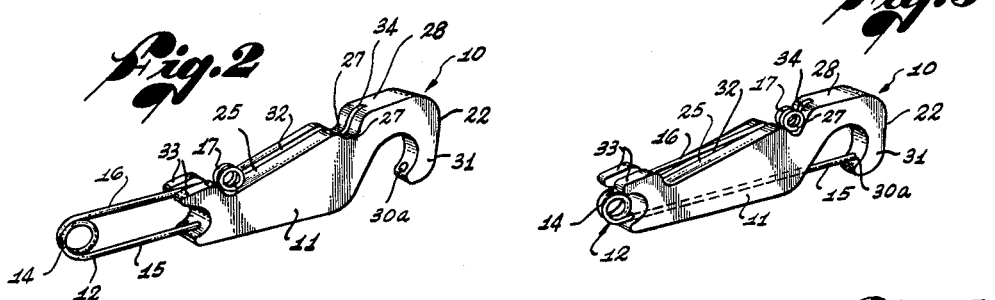
Fig. 2
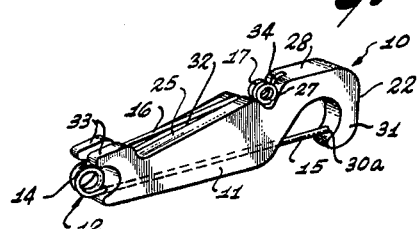
Fig. 3
Fig. 5
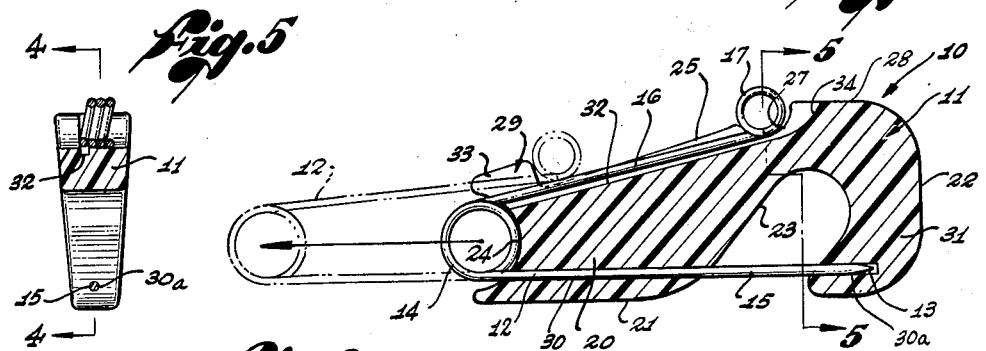
Fig. 4
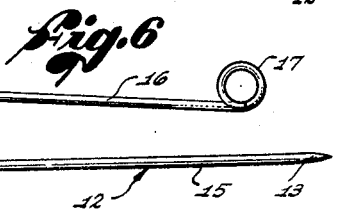
Fig. 6
INVENTOR.
DORIAN J. SWARTZ
BY Forrest J. Lilly
ATTORNEY

United States Patent Office 3,167,833
Patented Feb. 2, 1965

3,167,833
SAFETY PIN
Dorian J. Swartz, Yorba Linda, Calif. (P.O. Box 3545, Fullerton, Calif.), assignor of one-half to Richard J. Buechner, Fullerton, Calif.
Filed Feb. 4, 1964, Ser. No. 342,416
6 Claims. (Cl. 24—158)

This invention relates generally to safety pins and, more particularly, to safety pins of a type in which the pointed shank of the pin moves longitudinally across a cloth-receiving gap or recess into a socket in the course of closing the pin, and is then spring locked in such position.

The conventional safety pin is safe only to a degree, and, by virtue of its outwardly angling pointed shank, is actually hazardous all times that it is not closed. It is, for example, quite easy to stick such a pin into an infant in the act of diapering him.

The object of the present invention is to provide an improved safety pin of the class first mentioned, having added novel features of advantage which are of sufficient importance to warrant replacement of the common safety pin which is still in universal use.

The novel features and advantages of the invention will be left without further preliminary discussion to be gathered from the following detailed description of a present illustrative embodiment thereof.

In the drawings:

FIG. 1 shows a baby with a diaper pinned with the pin of the invention;

FIG. 2 is a perspective view of the pin of the invention shown in open position;

FIG. 3 is a view of the same pin, in closed position;

FIG. 4 is a longitudinal section through the pin, taken on the broken line 4—4 of FIG. 5, and to approximately double scale;

FIG. 5 is a section taken on broken line 5—5 of FIG. 4; and

FIG. 6 shows the pin element of the invention separated from the holder.

In the drawings, numeral 10 designates generally the safety pin of the invention, a holder or guide element being designated at 11, and the pin element at 12.

The pin element 12 is formed of a single piece of steel wire, provided with a sharp point 13 at one end, formed at an intermediate portion of its length with a two-turn spring eye or loop 14, so as to afford two generally parallel but normally somewhat convergent shanks or arms 15 and 16, and with an outwardly disposed three-turn loop 17 at the opposite end. The pointed shank 15 may be called the pin shank, and the shank 16 with the loop at the end the guide or stop shank. The loop 17 is tangential to the latter, and turned away from the pin shank 15. The shank 16 with the loop is somewhat shorter than the pin shank 15, for a reason that will appear later.

The guide or holder 11 is preferably composed of plastic, and may advantageously be a die casting. The body 20 of the holder is elongate and somewhat tapered in general form, and has flat opposite sides, a longitudinal bottom edge 21, formed near the front end 22 of the body with a deep lateral cloth-receiving recess or notch 23, a rearward concave end 24, and a slanting back or upper edge 25. This back edge 25 is generally angularly divergent from bottom edge 21 from a point a short distance forwardly from concave end 24 to a point approximately over the bottom of recess 23. At the top of the upward incline of edge 25, there is formed a substantially half-round notch 27, sunk well below the line of edge 25, and this notch meets an upper or back edge portion 28 which is parallel with bottom edge 21, and merges with the front end 22 of the holder body. Rising from the base or lower end portion of upwardly slanting edge 25, and immediately adjacent concave rear end 24, is an upwardly projecting stop element generally indicated at 29.

A close tolerance guide hole 30 for the pin shank 15 is formed in body 20, parallel and close spaced to edge 21, with an entrance opening in concave end 24, and an axially aligned but separated portion 30a thereof in the hook-like front end portion 31 of the body. The hole 30, 30a will be seen to extend along a line which crosses the mouth of the notch 23. The hole 30, 30a is preferably located half way between the opposite sides of the body 20.

A guide groove 32 is sunk in and runs up the slanting back surface 25 of the body 20, continuing through and splitting stop element 29 into two separate ears 33 at the bottom, and running out at a short distance under and forwardly of notch 27, as at 34. The guide groove 32 is offset laterally by a distance equal to double the thickness of the wire from which the pin 12 is fabricated, so that, with the pin shank 15 inserted in hole 30, the shank 16, which is displaced laterally by such distance from the shank 15 by the two-turn loop 14, will then lie naturally in the plane of groove 32.

The pin 12 is assembled with the holder 11 by first introducing the sharpened end of pin shank 15 into hole 30, and then pulling up on shank 16, against the spring resistance of loop 14, until the looped end of shank 16 clears guide ears 33. By moving the pin a short distance further forwardly, loop 17 clears ears 33, and shank 16 drops into guide groove 32.

The pin is then in the open position of FIG. 2. It will be noted that the sharp point 13 is protected at this time. It will also be noted that the shanks 15 and 16 are spread apart at this time against the spring resistance of loop 14, which exerts a restoring force which tends to frictionally, but yieldingly, bind the pin in such open position. Moreover, the guide or stop ears 33, in engagement in back of loop 17, function at this time to prevent removal of the pin from the holder, which can only be accomplished deliberately and intentionally, though conveniently, by elevating the loop 17 against the spring resistance of loop 14 to clear ears 33.

It will be observed (FIG. 2) that loop 17 now rides as a shoe element on slanting holder surface 25. To close the pin, finger pressure is exerted on loop 14, causing loop 17 to ride up surface 25, and the pointed shank 15 to advance in guide hole 30, into and across recess 23, and finally into protective end hole 30a in the front hook portion 31 of the holder. As the latter occurs, the loop 17 on pin shank 16 drops into notch or relief 27, the slot or groove 32 receiving shank 16 from end to end (FIGS. 3 and 4). The restoring spring pressure exerted by the spring loop 14, which, as will be apparent, is opposite from conventional safety pins, being such as to move shank 16 inward or toward shank 15, yieldingly or pressurably moves the pin to the position of FIGS. 3 and 4. It will be clear that this spring force releasably locks the pin in the closed position of FIGS. 3 and 4. To open the pin, the eye 17 is lifted slightly and pressed toward the left (as viewed in FIGS. 3 and 4), so as to shift the pin back to the position of FIG. 2. The loop 17 can readily and easily be pried up and started downward of the slope by inserting the thumbnail between it and the back surface of the notch 27.

To use the pin in the diapering of a baby, it is recommended that the pin, in fully open position, be held between the fingers of the right hand, with the end 22 away from the user, and the notch 23 down. The fingers of the left hand are held under the cloth, and the thumb placed on the body surface 28, which constitutes a "thumbpiece." The cloth is then pressed into the recess from below with the fingers of the left hand, and as this is done, and the pin held down by the thumb, the fingers are spread to opposite sides of the pin body or holder. The pin is then pushed across the mouth of recess 23, through the fold of cloth inserted in the notch, and into the end hole 30a, by the fingers of the right hand, until the loop 17 drops into the locking notch 27.

The baby cannot be stuck by the pin point, and the user is also almost wholly protected against sticking. The pointed shank cannot become unfastened and spring out into a dangerous position. The pin can be readily disassembled from the holder for replacement or sterilization. The pin of the invention has been fabricated to incorporate physical forms and mechanical actions which render it dependable and foolproof, exceptionally easy to manipulate, simple and inexpensive to manufacture, and easy to assemble and disassemble, especially in the hands of the final consumer.

I claim:
1. In a safety pin:
a body of generally elongate form having longitudinal edges, a front end, and a rearward end, and having a deep lateral cloth-receiving notch sunk in one longitudinal edge thereof near said front end so as to provide a hook-like formation at said front end,
there being a pin guide hole in said body near said one longitudinal edge thereof along a longitudinal line of said body which extends across the mouth of said hook-like formation, with a portion of said hole in the latter, and the remainder extending entirely through the portion of said body in back of said hook-like formation,
the other longitudinal edge of said body slanting angularly away from said hole in said body in a direction from the rearward end of said body toward the forward end thereof,
a steel wire pin comprised of two pin shanks connected by a spring loop extending generally in the same direction from said loop, one of said pin shanks being receivable in said pin guide hole, and being pointed at its free end,
the other of said pin shanks being adapted to overlie said slanting longitudinal edge of said body, and its free end having a shoe element adapted for sliding engagement and guidance by said slanting longitudinal edge,
said pin shanks being angularly spread apart as said pin is moved to cause said shoe element to ride up said slanting surface and the pointed pin shank to advance in said guide hole across the mouth of said notch, and said pin shanks having a normal angular position relative to one another such as to develop an elastic return stress as they are so angularly spread apart, and
there being a locking depression in said slanting edge of said body positioned to register with said shoe element when an end portion of the pointed pin shank has been received into the guide hole portion in said hook-like formation, said shoe element dropping into said depression and being yieldably locked therein by virtue of elastic restoring stress developed in said pin by said spreading of said pin shanks.

2. The subject matter of claim 1, wherein said shoe element extends laterally to one side of its pin shank, and including a pair of spaced guide ears on said body at the base of said slanting longitudinal edge of said body, said ears receiving said last-mentioned pin shank for guidance thereof, and at least one of said ears being engageable as a stop by said shoe element.

3. The subject matter of claim 1, wherein said slanting longitudinal edge of said body has a groove therein which underlies said pin shank which carries said shoe element, and which receives said last-mentioned pin shank when said shoe element falls into said depression.

4. The subject matter of claim 3, wherein said shoe element comprises a loop formed tangentially on the end of the corresponding pin shank and turned away from said slanting longitudinal edge of said body.

5. The subject matter of claim 1, wherein said pin shanks extend angularly toward one another from said spring loop in the normal unstressed condition of said pin when disassembled from said body.

6. In a safety pin:
a body of generally elongate form having longitudinal edges, a front end, and a rearward end, and having a deep lateral cloth-receiving notch sunk in one longitudinal edge thereof near said front end so as to provide a hook-like formation at said front end,
there being a pin guide hole in said body near said one longitudinal edge thereof along a longitudinal line of said body which extends across the mouth of said hook-like formation, with a portion of said hole in the latter, and the remainder extending entirely through the portion of said body in back of said hook-like formation,
the other longitudinal edge of said body slanting angularly away from said hole in said body in a direction from the rearward end of said body toward the forward end thereof,
a steel wire pin comprised of two pin shanks connected by a spring loop extending generally in the same direction from said loop, one of said pin shanks being receivable in said pin guide hole, and being pointed at its free end,
the other of said pin shanks being adapted to overlie said slanting longitudinal edge of said body, and its free end having a tangential multiple-turn helical loop formed thereon, turned away from said slanting longitudinal edge, and adapted for sliding engagement and guidance by the latter,
said pin shanks being angularly spread apart as said pin is moved to cause said multiple-turn loop to ride up said slanting surface and the pointed pin shank to advance in said guide hole across the mouth of said notch, and said pin shanks having a normal angular position relative to one another such as to develop an elastic return stress as they are so angularly spread apart,
there being a locking depression in said slanting edge of said body positioned to register with said multiple-turn loop when an end portion of the pointed pin shank has been received into the guide hole portion in said hook-like formation, said multiple-turn loop dropping into said depression and being yieldably locked therein by virtue of elastic restoring stress developed in said pin by said spreading of said pin shanks,
said slanting longitudinal edge of said body having a groove therein which underlies said pin shank on which said multiple-turn loop is formed, and which receives said last-mentioned pin shank when said multiple-turn loop falls into said depression, and
a pair of guide ears on said body at the base of said slanting longitudinal edge of said body, said ears receiving said last-mentioned pin shank for guidance thereof, and at least one of said ears being engageable as a stop by said multiple-turn loop.

References Cited in the file of this patent

UNITED STATES PATENTS

| | | |
|---|---|---|
| 780,238 | Shephard | Jan. 17, 1905 |
| 2,627,096 | Alessi | Feb. 3, 1953 |